United States Patent
Fukushima et al.

(10) Patent No.: US 8,211,546 B2
(45) Date of Patent: Jul. 3, 2012

(54) COATING COMPOSITION AND COATED ARTICLE

(75) Inventors: Motoo Fukushima, Annaka (JP); Koichi Higuchi, Annaka (JP); Hisatoshi Komori, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 23 days.

(21) Appl. No.: 12/852,838

(22) Filed: Aug. 9, 2010

(65) Prior Publication Data
US 2011/0034626 A1  Feb. 10, 2011

(30) Foreign Application Priority Data
Aug. 10, 2009  (JP) .................................. 2009-185591

(51) Int. Cl.
*B32B 9/04* (2006.01)
*C08G 77/00* (2006.01)
*C08L 83/06* (2006.01)

(52) U.S. Cl. ............ 428/447; 428/446; 528/10; 528/16; 524/588

(58) Field of Classification Search .................. 528/10, 528/16; 524/588
See application file for complete search history.

(56) References Cited

U.S. PATENT DOCUMENTS

| | | | |
|---|---|---|---|
| 3,931,267 A * | 1/1976 | Brode | 556/449 |
| 4,027,073 A | 5/1977 | Clark | |
| 4,028,300 A | 6/1977 | Wake et al. | |
| 4,486,503 A | 12/1984 | Vaughn, Jr. | |
| 5,438,094 A * | 8/1995 | Fujiki et al. | 524/730 |
| 6,335,414 B1 * | 1/2002 | Sakamoto et al. | 528/34 |
| 2006/0204873 A1 * | 9/2006 | Tong et al. | 430/66 |
| 2007/0254222 A1 * | 11/2007 | Bender et al. | 430/56 |
| 2011/0097586 A1 * | 4/2011 | Liao et al. | 428/412 |

FOREIGN PATENT DOCUMENTS

| | | |
|---|---|---|
| JP | 48-26822 | 4/1973 |
| JP | 51-2736 | 1/1976 |
| JP | 51-33128 | 3/1976 |
| JP | 55-94971 A | 7/1980 |
| JP | 58047013 A * | 3/1983 |
| JP | 04036290 A * | 2/1992 |
| JP | 10-324827 A | 12/1998 |
| JP | 11-286652 A | 10/1999 |
| JP | 2005290312 A * | 10/2005 |

* cited by examiner

*Primary Examiner* — Robert S Loewe
(74) *Attorney, Agent, or Firm* — Birch, Stewart, Kolasch & Birch, LLP

(57) ABSTRACT

A composition comprising (A) a hydrolytic condensate of a bisphenol A alkoxysilane, (B) silica colloid sol, and (C) a curing catalyst is coated and cured to a transparent substrate to form a transparent film having crack resistance, flexibility and water vapor barrier properties.

4 Claims, No Drawings

COATING COMPOSITION AND COATED ARTICLE

CROSS-REFERENCE TO RELATED APPLICATION

This non-provisional application claims priority under 35 U.S.C. §119(a) on Patent Application No. 2009-185591 filed in Japan on Aug. 10, 2009, the entire contents of which are hereby incorporated by reference.

TECHNICAL FIELD

This invention relates to coating compositions and coated articles using the same. More particularly, it relates to coating compositions which are coated to soft surfaces of substrates of plastics and light metals and cured into a protective film having improved water vapor barrier properties and mar resistance, and coated articles having cured films of the coating compositions on substrates.

BACKGROUND ART

Plastic materials are used in a wide variety of applications on account of their advantages including light weight and ease of working. Because of their drawback of poor mar resistance on the surface, improvements were made in the prior art in order to provide surface protection to substrates.

When substrates of plastics and light metal materials having soft surfaces are used in the application where a high level of mar resistance is required, siloxane-based thermosetting hard coat compositions are used. For the siloxane-based hard coat compositions, a number of technical proposals were made. For example, JP-A S51-2736 and JP-A S55-94971 disclose coating compositions comprising a partial condensate of trihydroxysilane and colloidal silica. JP-A S48-26822 and JP-A S51-33128 disclose coating compositions comprising primarily a partial condensate of alkyltrialkoxysilane and tetraalkoxysilane. These compositions are still not fully satisfactory in mar resistance and coating liquid stability.

JP-A H11-286652 and JP-A H10-324827 intend to promote curing of coating compositions by adding thereto a titanium chelate compound or a partial hydrolytic condensate thereof so as to play the role of a catalyst for promoting cure. Although these proposals achieve some improvements, problems of stability and crack resistance are left unsolved.

In the inorganic siloxane structure based curable coating compositions which have been proposed thus far, siloxane linkage is sensitive to humidity with time because of high water vapor permeability. There exists a need for a hard coat composition which obviates the problem of crack generation by external shocks over a period of time and has improved mar resistance.

CITATION LIST

Patent Document 1: JP-A S51-2736
Patent Document 2: JP-A S55-94971
Patent Document 3: JP-A S48-26822
Patent Document 4: JP-A S51-33128
Patent Document 5: JP-A H11-286652
Patent Document 6: JP-A H10-324827

SUMMARY OF INVENTION

An object of the present invention is to provide coating compositions which can be efficiently coated and cured into cured films having crack resistance, flexibility and water vapor barrier properties; and coated articles having cured films of the compositions on the surface of substrates.

The inventors have found that a coating composition comprising (A) a hydrolytic condensate of a bisphenol A alkoxysilane, (B) silica colloid sol, and (C) a curing catalyst can solve the outstanding problems; that the composition does not sacrifice the advantages of inorganic siloxane structure based curable coating compositions, overcomes the problem of crack formation after curing which has been difficult to overcome with inorganic curable compositions of this type, and thus offers a high level of mar resistance; and that while the composition maintains storage stability and cure behavior, it can be coated and cured to a substrate to form a film satisfying the requirements of mar resistance, hard coat physical properties, film formation, crack resistance, flexibility and water vapor barrier properties.

In one aspect, the invention provides a coating composition comprising (A) a hydrolytic condensate of an alkoxysilane, (B) silica colloid sol, and (C) a curing catalyst as essential components, the alkoxysilane hydrolytic condensate (A) is obtained from hydrolytic condensation of a hydrolyzable radical-containing organosilicon compound comprising at least 10% by weight of a compound having the general formula (I):

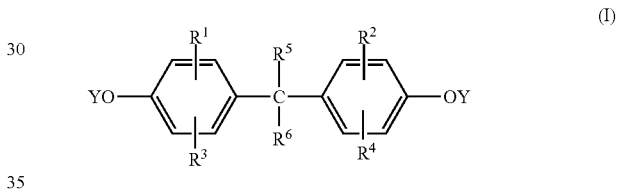

(I)

wherein $R^1$ to $R^4$ are each independently hydrogen, halogen, alkyl, alkoxy or aryl radical, $R^5$ and $R^6$ are each independently hydrogen, $C_1$-$C_{10}$ alkyl or $C_6$-$C_{10}$ aryl, $R^5$ and $R^6$ may bond together to form a $C_1$-$C_{13}$ carbocyclic or heterocyclic ring with the carbon atom to which they are attached, the carbon-containing radicals of $R^5$ and $R^6$ may have a $C_1$-$C_5$ alkyl, $C_2$-$C_5$ alkenyl or $C_1$-$C_5$ alkoxy substituted thereon, and Y is each independently a radical of the formula:

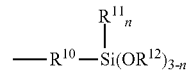

wherein $R^{10}$ is $C_2$-$C_6$ alkylene, $R^{11}$ and $R^{12}$ are each independently $C_1$-$C_5$ alkyl, and n is 0, 1 or 2.

In a preferred embodiment, the alkoxysilane hydrolytic condensate (A) is obtained from cohydrolytic condensation of (1) the compound having formula (I) and (2) an organosilicon compound having at least one hydrolyzable radical, represented by the general formula (II) and/or a partial hydrolyzate thereof:

$$A^1{}_a A^2{}_b Si(OA^3)_{4-a-b} \quad (II)$$

wherein $A^1$ is each independently $C_1$-$C_{10}$ alkyl, $A^2$ is a functional radical containing at least one organic radical selected from the group consisting of aryl, haloalkyl, haloaryl, alkenyl, epoxy, (meth)acryloyl, vinyl, mercapto, amino, ureido and cyano, $A^3$ is each independently $C_1$-$C_{10}$ alkyl, alkenyl, acyl or alkoxyalkyl, a and b each are 0, 1 or 2, and a+b is 0, 1 or 2.

In a preferred embodiment, the alkoxysilane hydrolytic condensate (A) is obtained by effecting hydrolytic condensation of (1) the compound having formula (I) or (1) the compound having formula (I) and (2) the organosilicon compound having formula (II) and/or partial hydrolyzate thereof, in the presence of component (B) and an acidic catalyst.

In a preferred embodiment, the curing catalyst (C) is an aluminum compound or alkaline ammonium compound.

In a preferred embodiment, the coating composition forms a substantially colorless transparent film when cured.

Also contemplated herein is a coated article comprising a transparent substrate and a film of the coating composition cured thereto.

ADVANTAGEOUS EFFECTS OF INVENTION

From the coating composition of the invention, a hard coat film having water vapor barrier properties can be formed without interfering with cure behavior. A composite film can be formed which has both hard coat-like physical properties inherent to inorganic organosiloxane compounds and properties of organic polymers including film formation, crack resistance, flexibility and water vapor barrier properties. The composition does not sacrifice the advantage (high level of mar resistance) of inorganic siloxane structure based curable coating compositions and overcomes the problem of crack formation after curing which has been difficult to overcome with inorganic curable compositions of this type. Additionally, the composition has storage stability. In summary, from a coating composition comprising silica colloid sol, a protective film having water vapor barrier properties and mar resistance can be formed on substrates of plastics or light metals having a soft surface.

DESCRIPTION OF EMBODIMENTS

The singular forms "a", "an" and "the" include plural referents unless the context clearly dictates otherwise. As used herein, the terminology "$(C_x-C_y)$", as applied to a particular unit, such as, for example, a chemical compound or a chemical substituent radical, means having a carbon atom content of from "x" carbon atoms to "y" carbon atoms per such unit.

The coating composition of the invention is defined as comprising (A) a hydrolytic condensate of an alkoxysilane, (B) silica colloid sol, and (C) a curing catalyst as essential components. The alkoxysilane hydrolytic condensate (A) is obtained from hydrolytic condensation of a hydrolyzable radical-containing organosilicon compound comprising at least 10% by weight of a compound having the general formula (I).

Component A

Component (A), alkoxysilane hydrolytic condensate comprises essentially (1) a compound having the general formula (I) as one reactant.

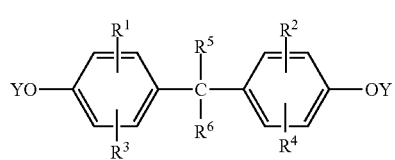
(I)

In formula (I), $R^1$ to $R^4$ which may be the same or different are hydrogen, halogen, alkyl radicals, alkoxy radicals or aryl radicals. Examples include hydrogen, halogen atoms such as fluorine, chlorine and bromine, $C_1-C_8$ alkyl radicals such as methyl, ethyl, propyl, isopropyl, butyl, isobutyl, tert-butyl, pentyl, neopentyl, hexyl, cyclohexyl, and octyl, $C_1-C_4$ alkoxyl radicals such as methoxyl, ethoxyl, propoxyl and butoxyl, and $C_6-C_{10}$ aryl radicals such as phenyl, tolyl, xylyl, and naphthyl.

$R^5$ and $R^6$ which may be the same or different are hydrogen, $C_1-C_{10}$ alkyl or $C_6-C_{10}$ aryl. Suitable alkyl radicals include methyl, ethyl, propyl, isopropyl, butyl, isobutyl, tert-butyl, pentyl, neopentyl, hexyl, cyclohexyl, and octyl, and suitable aryl radicals include phenyl, tolyl, xylyl, and naphthyl.

$R^5$ and $R^6$ may bond together to form a $C_3-C_{13}$ carbocyclic or heterocyclic ring with the carbon atom to which they are attached. If the ring-forming radicals of $R^5$ and $R^6$ contain carbon atoms, they may be substituted with a $C_1-C_5$ alkyl radical such as methyl, ethyl, propyl, isopropyl, butyl, isobutyl, tert-butyl, pentyl or neopentyl, a $C_2-C_5$ alkenyl radical such as vinyl, allyl, propenyl, isopropenyl or butenyl, or a $C_1-C_5$ alkoxy radical such as methoxy, ethoxy, propoxy or butoxy.

One example of the $C_3-C_{13}$ carbocyclic or heterocyclic ring is given below.

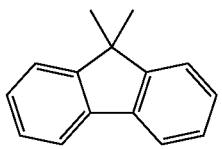

One example of the substituted carbocyclic or heterocyclic ring is given below.

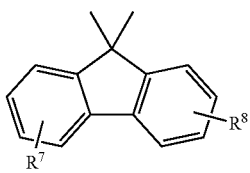

Herein $R^7$ and $R^8$ are substituent groups as exemplified above.
Y is each independently a radical of the formula.

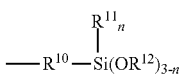

Herein $R^{10}$ is a $C_2-C_6$ alkylene radical such as ethylene, propylene, isopropylene, butylene, isobutylene, or hexylene. $R^{11}$ and $R^{12}$ which may be the same or different are a $C_1-C_5$ alkyl radical such as methyl, ethyl, propyl, isopropyl, butyl, isobutyl, tert-butyl, pentyl or neopentyl. The subscript n is 0, 1 or 2, preferably 0 or 1, and most preferably 0.

Typically Y has a structure of the following formula.

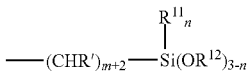

Herein $R^{11}$, $R^{12}$ and n are as defined above, R' is hydrogen or $C_1-C_3$ alkyl such as methyl, ethyl or propyl, and m is 0 to 4.

The compound of formula (I) may be prepared by reacting a compound having at least two phenol radicals of the general formula (i) with an allyl compound or a methallyl compound of the general formula (ii) to synthesize a phenoxy ether compound having an allyl or methallyl radical, and further reacting with a hydroxysilyl-containing alkoxysilane of the general formula (iii) in the presence of a platinum catalyst.

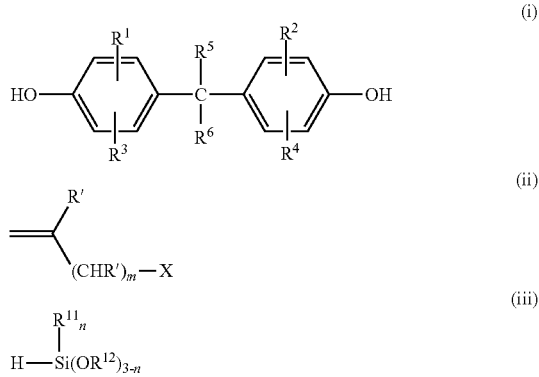

Herein $R^1$ to $R^6$, $R^{11}$, $R^{12}$, n and m are as defined above, and X is a halogen atom such as iodo, chloro or bromo.

Examples of the compound having at least two phenol radicals of formula (i) include bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl) phenylmethane, 1,1-bis(4-hydroxyphenyl)-1-phenylethane, bis(4-hydroxyphenyl)diphenylmethane, 2,2-bis(4-hydroxy-3-methylphenyl)propane, 1,1-bis(4-hydroxy-3-tert-butylphenyl)propane, 2,2-bis(3,5-dimethyl-4-hydroxyphenyl)propane, 2,2-bis(4-hydroxy-3-phenylphenyl)propane, 2,2-bis(3-cyclohexyl-4-hydroxyphenyl)propane, 2,2-bis(4-hydroxy-3-bromophenyl)propane, 2,2-bis(3,5-dibromo-4-hydroxyphenyl)propane, 1,1-bis(4-hydroxyphenyl)cyclopentane, 1,1-bis(4-hydroxyphenyl)cyclohexane, and 2,2-bis(4-hydroxy-3-methoxyphenyl)propane. Inter alia, 2,2-bis(4-hydroxyphenyl)propane, generally known as bisphenol A, is preferred because bisphenol A is mass manufactured and available at reasonable prices as the polycarbonate resin reactant. On use of bisphenol A, impact resistance may be enhanced at no sacrifice of heat resistance.

Fluorene compounds of the general formula (i'):

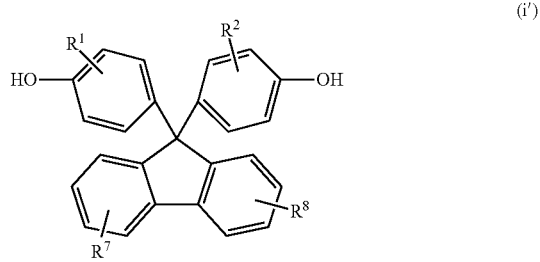

wherein $R^1$, $R^2$, $R^7$ and $R^8$ are as defined above are also useful as a bisphenol having a pendant fluorene structure. Examples of the fluorene compound of formula (i') include 9,9-bis(4-hydroxyphenyl)fluorene, 9,9-bis(4-hydroxy-3-methylphenyl)fluorene, and 9,9-bis(4-hydroxy-3-ethylphenyl)fluorene.

As mentioned above, the compound of formula (I) is prepared by reacting a compound having at least two phenol radicals of formula (i) with a halide having an allyl or methallyl radical. More specifically, a compound of formula (i) is reacted with an allyl compound such as allyl chloride, allyl bromide or allyl iodide or a methallyl compound of formula (ii) such as methallyl chloride, methallyl bromide or methallyl iodide in the presence of a base (e.g., alkali metal hydroxides, alkaline earth metal hydroxides, alkali metal alkoxides, alkaline earth metal alkoxides, alkali metal carbonates, alkaline earth metal carbonates, and amines), in a solvent inert to the reaction (e.g., ketones, esters and ethers), to synthesize a phenoxy ether compound having an allyl or methallyl radical. The reaction may be carried out at room temperature to about 200° C., and preferably 50 to 150° C. Typically the reaction is completed in about 30 minutes to 10 hours when the temperature is about 120° C.

Next the phenoxy ether compound is reacted with a hydrosilane of formula (iii) in the presence of a platinum catalyst and optionally in a solvent inert to the reaction, e.g., toluene or tetrahydrofuran or in a solventless system, to thereby synthesize a compound of formula (I).

The hydrosilane of formula (iii) may be selected from hydrosilane compounds having 1 to 3 $C_1$-$C_5$ alkoxy radicals such as methoxy, ethoxy, propoxy, butoxy and pentoxy. Of these hydrosilane compounds, trimethoxysilane and triethoxysilane are preferred.

The reaction may be carried out at room temperature to about 150° C., and preferably 25° C. to about 100° C. When trimethoxysilane is used, the reaction may be completed in about 30 minutes to 2 hours at room temperature or by heating at a temperature of up to about 80° C.

While the alkoxysilane hydrolytic condensate (A) may be a hydrolytic condensate of a compound of formula (I) alone, it may also be a cohydrolytic condensate of (1) a compound of formula (I) and (2) an organosilicon compound containing at least one hydrolyzable radical of the general formula (II) and/or a partial hydrolytic condensate thereof. In the latter case, the compound of formula (I) should be used in an amount of at least 10% by weight based on a mixture of compounds of formulae (I) and (II) prior to hydrolytic condensation.

Compound (2), hydrolyzable radical-containing organosilicon compound has the general formula (II):

$$A^1_a A^2_b Si(OA^3)_{4-a-b} \quad (II)$$

wherein $A^1$ is each independently $C_1$-$C_{10}$ alkyl, $A^2$ is a functional radical containing at least one organic radical selected from the group consisting of aryl, haloalkyl, haloaryl, alkenyl, epoxy, (meth)acryloyl, vinyl, mercapto, amino, ureido and cyano, $A^3$ is each independently $C_1$-$C_{10}$ alkyl, alkenyl, acyl or alkoxyalkyl, a and b each are an integer of 0, 1 or 2, preferably 0 or 1, and a+b is an integer of 0, 1 or 2, preferably 0 or 1, and most preferably 1.

Examples of the silane of formula (II) include tetramethoxysilane, tetraethoxysilane, tetra-n-propoxysilane, tetraisopropoxysilane, tetra-n-butoxysilane, tetraisobutoxysilane, methyltrimethoxysilane, methyltriethoxysilane, ethyltrimethoxysilane, isobutyltrimethoxysilane, vinyltrimethoxysilane, vinyltriethoxysilane, γ-methacryloxypropyltrimethoxysilane, γ-acryloxypropyltrimethoxysilane, β-(3,4-epoxycyclohexyl)ethyltrimethoxysilane, γ-glycidoxypropyltrimethoxysilane, γ-aminopropyltrimethoxysilane, N-β-(aminoethyl)-γ-aminopropyltriethoxysilane, dimethyldimethoxysilane, vinylmethyldimethoxysilane, γ-mechacryloxypropylmethyldimethoxysilane, γ-acryloxypropylmethyldimethoxysilane, γ-glycidoxypropylmethyldimethoxysilane, γ-aminopropylmethyldimethoxysilane, γ-ureidopropyltrimethoxysilane, γ-ureidopropyltriethoxysilane, γ-isocyanatopropyltrimethoxysilane, γ-isocyanatopropyltriethoxysilane, phenyltriethoxysilane, and phenyltrimethoxysilane. These silanes may be used alone or in admixture, while the silane may have been hydrolyzed prior to use.

It is noted that the raw material from which the alkoxysilane hydrolytic condensate (A) is prepared should contain 10 to 100% by weight of (1) the compound of formula (I). Particularly when the coating composition of the invention is used as hard coats, typically conformal hard coats, the raw material should preferably contain 10 to 70%, more preferably 15 to 50% by weight of compound (1) and 90 to 30%, more preferably 85 to 50% by weight of compound (2). When the coating composition is used in applications other than hard coats, the raw material should preferably contain 50 to 100%, more preferably 70 to 100% by weight of compound (1) and 50 to 0%, more preferably 30 to 0% by weight of compound (2). If the amount of compound (1) used is less than 10% by weight, the desired effects may not be fully exerted.

Component (A) may be prepared by subjecting the raw material to (co)hydrolytic condensation. When compound (1) or a mixture of compound (1) and compound (2) is subjected to (co)hydrolytic condensation to prepare component (A), silica colloid sol as component (B) may preferably be added. This means that component (A) is prepared in the presence of component (B).

In a preferred embodiment of the coating composition, the hydrolytic condensate as component (A) is synthesized in such a manner that silica colloid sol as component (B) may be integrated with component (A). This leads to further improvements in transparency, hardness and mar resistance.

When the hydrolytic condensate as component (A) is prepared by hydrolyzing the raw material for component (A) in the co-presence of metal-OH linkages in silica colloid sol as component (B), an inorganic-organic hybrid material may be readily formed. A cured film of the coating composition containing such an inorganic-organic hybrid material of components (A) and (B) is substantially uniform, colorless and transparent and possesses a hybrid profile of properties including inherent properties of inorganic siloxane resin such as hardness, mar resistance, heat resistance, weathering resistance and acid resistance.

In the practice of the invention, a composite material of alkoxysilane hydrolytic condensate (A) and silica colloid sol (B) is obtained when (1) the compound of formula (I) or a mixture of (1) the compound of formula (I) and (2) the hydrolyzable radical-containing organosilicon compound of formula (II) and/or partial hydrolytic condensate thereof is subjected to hydrolytic condensation in the presence of an acidic catalyst and silica colloid sol (B).

Component B

Component (B) is silica colloid sol (colloidal silica). Silica particles are believed to play both the role of a filler for imparting hardness and abrasion resistance to a film and the role of a crosslinker for bonding with silanol radicals in compounds (1) and (2) for component (A) as a binder at particle surfaces. More specifically, silica particles as component (B) have on their surfaces hydroxyl or silanol radicals (Si—OH) which are capable of forming linkages (Si—O—Si) with compounds (1) and (2) for component (A). The colloidal silica is generally a colloidal dispersion of silicon oxide, that is, a silicon oxide sol in a dispersing medium, typically a polar solvent such as water or alcohols.

Preferred is a colloidal dispersion of silica nanoparticles having an average particle size of 5 to 200 nm, more preferably 5 to 40 nm in water or organic solvents. It is noted that the particle size is measured by the laser light scattering method, specifically by a laser scattering particle size distribution analyzer LA-910 by Horiba, Ltd.

Inter alia, colloidal silica dispersed in acidic aqueous solution is most preferred when reaction with the alkoxysilane hydrolytic condensate (A) is considered, because the silica has a readily combinable SiOH surface state. Examples of commercially available colloidal silica include Snowtex-O by Nissan Chemical Industries, Ltd., Cataloid SN by Catalysts & Chemicals Industries Co., Ltd., and Silicadol 30A by Nippon Chemical Industrial Co., Ltd.

Also useful is a stabilized form of colloidal silica which is obtained by adding organic acids or mineral acids to alkaline colloidal silica for stabilizing it in the colloidal silica acidic metastable region at pH 3 to 5 so that the surface is of SiOH type.

Examples of commercially available colloidal silica dispersed in organic solvents include PMA-ST, IPA-ST, NBA-ST, IBA-ST, EG-ST, XBA-ST, NPC-ST, and DMAC-ST by Nissan Chemical Industries, Ltd., and OSCAL 1132, OSCAL 1232, OSCAL 1332, OSCAL 1432, OSCAL 1532, OSCAL 1632, and OSCAL 1732 by Catalysts & Chemicals Industries Co., Ltd.

Prior to use, component (B) may have been partially treated or coated with silane coupling agents, tetraalkoxysilanes (e.g., tetraethoxysilane), titanium coupling agents, or carboxyl-containing organic polymers. In this embodiment, the main ingredient of component (B) is silica, and the content of organic matter added for stabilization or used for coverage is preferably up to 10% by weight based on the inorganic silicon dioxide.

As described above, in a preferred embodiment, component (A) is prepared by adding component (B) to the raw material for component (A). This method is efficient when acidic or alkaline water-dispersed silica sol is used, and more efficient when acidic water-dispersed silica sol is used. When this preparation method is employed, an amount of water in the water-dispersed silica sol is preferably at least 1 mole, more preferably at least 1.2 moles per mole of the entire hydrolyzable radicals in compounds (1) and (2) (i.e., $OR^{12}$ in formula (I) and $OA^3$ in formula (II)). With less than 1 mole of water, some hydrolyzable radicals may be left as such, leading to a lower crosslinking density, and hence, drops of hardness and adhesion. Although no particular upper limit is imposed on the amount of water, it is usually up to 10 moles, preferably up to 5 moles.

Preferably component (A) is substantially an SiOH-terminated organosiloxane. The termination with SiOH ensures that when the coating composition is coated onto a substrate surface and heated, dehydration and condensation takes place to form siloxane linkages. If the terminal is in the form of SiOR (wherein R is $R^{12}$ or $A^3$ as defined above) at this point, this is undesirable in that the coating step must be followed by hydrolysis, the coating is sensitive to environmental moisture, and a catalyst must be added in some cases. In the coating composition, the alkoxysilane hydrolytic condensate (A) is considered to develop hardness and mar resistance due to SiOH generated by hydrolysis of the raw material. Preparation of component (A) with a controlled amount of water during synthesis is important for component (A) to exert a high hardness, high mar resistance and high abrasion resistance in a consistent manner.

In order to exert the above-mentioned functions, water is preferably added in an amount of 1 to 20 moles, more preferably 3 to 10 moles, and even more preferably 3.1 to 6 moles per mole of alkoxysilyl radicals in the raw material. The term "water" as used herein refers to all water contents added to the system, that is, the total of water contents contained in water-dispersed silica colloid sol, hydrolytic catalyst, organic polymer and the like added to the system. If the amount of water added is short, more or less terminals may be left as alkoxysilyl radicals rather than SiOH, failing to attain the object with respect to hardness. If the amount of water added is excessive, on the other hand, the system may become unstable, and many problems of whitening, bubbles and unevenness arise during film formation.

To water used for hydrolysis, a polar organic solvent is preferably added. Suitable polar organic solvents include alcohols such as methanol, ethanol, propanol, isopropanol, butanol, isobutanol, t-butanol, and diacetone alcohol, as well as ethylene glycol, monoethylene glycol monoether, propylene glycol, and propylene glycol monoether.

If desired, a hydrolytic catalyst may be used. The hydrolytic catalysts which can be used herein include well-known catalysts, for example, acidic hydrogen halides, carboxylic acids, sulfonic acids, acidic or weakly acidic oxides and inorganic salts, and solid acids such as ion-exchange resins. Specifically, organic acids such as acetic acid and maleic acid, and cation-exchange resins having sulfonic acid or carboxylic acid radicals on the surface are preferably used. An amount of the hydrolytic catalyst used is preferably 0.001 to 10 mol %, more preferably 0.1 to 5 mol % based on the moles of entire hydrolyzable radicals ($OR^{12}$ in formula (I) plus $OA^3$ in formula (II)).

Hydrolysis is preferably effected under weakly acidic conditions, specifically in the range of pH 1 to 7. If hydrolysis is otherwise effected, the resulting silanol radicals may become so unstable that condensation reaction may take place, resulting in a higher molecular weight.

In order that a cured film of the coating composition have a high hardness, the hydrolysis should be followed by condensation. Condensation may be effected continuous to the hydrolysis, while maintaining the liquid temperature at room temperature or heating at a temperature of up to 100° C. A temperature above 100° C. may cause gelation. Condensation may be promoted by distilling off the alcohol formed by hydrolysis at a temperature of at least 80° C. and atmospheric or subatmospheric pressure. Also for the purpose of promoting condensation, condensation catalysts such as basic compounds, acidic compounds or metal-chelate compounds may be added. Prior to or during condensation step, an organic solvent may be added for the purpose of adjusting the progress of condensation and the concentration. A dispersion of nanoparticle silica in water or organic solvent such as silicon dioxide sol may also be added for similar purposes. Since a silicone resin generally builds up its molecular weight and reduces its solubility in water and alcohol formed with a progress of condensation, the organic solvent added is preferably one having a boiling point of at least 80° C. and a relatively high polarity in which the product is fully dissolvable.

Examples of suitable organic solvents include alcohols such as isopropyl alcohol, n-butanol, isobutanol, t-butanol, and diacetone alcohol; ketones such as methyl propyl ketone, diethyl ketone, methyl isobutyl ketone, cyclohexanone, and diacetone alcohol; ethers such as dipropyl ether, dibutyl ether, anisole, dioxane, ethylene glycol monoethyl ether, ethylene glycol monobutyl ether, propylene glycol monomethyl ether, and propylene glycol monomethyl ether acetate; and esters such as propyl acetate, butyl acetate, and cyclohexyl acetate.

The silicone product resulting from condensation, that is, alkoxysilane hydrolytic condensate as component (A) should preferably have a weight average molecular weight (Mw) of at least 500, more preferably 1,000 to 50,000, even more preferably 1,500 to 20,000, as measured by gel permeation chromatography (GPC) versus polystyrene standards. With a Mw below the range, a coating tends to lose toughness and become prone to crack. On the other hand, a resin with too high a Mw tends to have a low hardness and the resin in a coating may undergo phase separation, incurring film whitening.

In the coating composition, the proportion of components (A) and (B) used is determined in consideration of the stability of the composition and the desired properties of the cured film including transparency, abrasion resistance, mar resistance, adhesion and crack resistance. Preferably the solid content of component (A) is 97 to 25%, more preferably 95 to 50% by weight, and the solid content of component (B) is 3 to 75%, more preferably 5 to 50% by weight, based on the total solid weight of components (A) and (B). Too low a proportion of component (A) used may detract from coating performance whereas a coating composition containing too high a proportion of component (A) may cure into a film which is poor in some properties such as hardness and mar resistance.

In the coating composition, colloid sol other than the silica colloid sol as component (B) may be added for the purposes of imparting various functions such as UV absorption, electric conductivity, photocatalytic activity, and refractive index control. Examples include colloid sol forms of magnesium oxide, composite oxide of silicon oxide/magnesium oxide, calcium oxide, barium oxide, boron oxide, aluminum oxide, indium oxide, germanium oxide, tin oxide, zinc oxide, titanium oxide, zirconium oxide, cesium oxide, indium tin oxide, and tin antimony oxide, alone or in admixture, which may optionally be surface-coated with silica or alumina. These metal colloid sols preferably have a particle size of 0.005 to 1 μm (5 to 1,000 nm) for maintaining transparency. The amount of colloid sol other than the silica colloid sol (B) is preferably up to 10% by weight of the overall composition. The colloid sol other than the silica colloid sol (B) may be added during or after preparation of component (A).

Component C

In the coating composition, (C) a curing catalyst is added to promote its cure. It is a catalyst for promoting condensation reaction of condensible radicals such as silanol and alkoxy radicals and may be selected from well-known curing catalysts used in conventional hard topcoat compositions. Examples of the curing catalyst include aluminum compounds such as aluminum acetylacetonate, aluminum acetate and aluminum perchlorate, organometallic alcolates or organometallic chelates of titanium, zirconium or the like, phosphoric acid or phosphoric esters, reaction products of acidic phosphoric esters with amines, addition products of epoxy compounds with phosphoric acid and monoacidic phosphoric esters, carboxylic acid salts of organic amines, alkali metal hydroxides, alkali metal carbonates, alkali metal alcoholates, onium salts, phosphines, amines, amidines, guanidines, and organotin compounds. Inter alia, sodium propionate, sodium acetate, sodium formate, trimethylbenzylammonium hydroxide, tetramethylammonium hydroxide, tetrabutylammonium hydroxide, tris(acetylacetonato)aluminum, and diisopropoxy (ethyl acetoacetate)aluminum are preferably used.

The amount of component (C) used is not particularly limited as long as it is effective for curing components (A) and (B). Specifically, component (C) is used in an amount of 0.001 to 10%, more preferably 0.01 to 5% by weight based on the total solid weight of components (A) and (B). Less than 0.001 wt % of component (C) may lead to under-cure and low hardness. More than 10 wt % of component (C) may result in d film which is prone to crack, or a substantially short pot life which is practically unacceptable.

It is noted that component (C) is preferably added after component (A) is prepared by cohydrolytic condensation of the raw material for component (A) in the presence of component (B).

In the coating composition, a solvent may be used if desired. The solvent should be such that the solid of component (A), organosiloxane resin may be dissolved therein to form a stable solution. To this end, the solvent used herein should preferably contain at least 20%, more preferably at least 50% by weight of an alcohol. Suitable alcohols include methanol, ethanol, 1-propanol, 2-propanol, 1-butanol, 2-butanol, 2-methyl-1-propanol, 2-ethoxyethanol, and 2-butoxyethanol. Of these, low boiling alcohols of 1 to 4 carbon atoms are preferred, and 2-propanol is most preferred for solubility, stability and coating characteristics.

The solvent used herein may include a portion of water contained in the water-dispersed silica colloid sol which does not participate in hydrolytic reaction, lower alcohols generated during hydrolysis of alkoxysilanes, the organic solvent as the dispersing medium of organic solvent-dispersed colloidal silica, if used, and an acid added to the coating composition for pH adjustment.

Examples of the acid added for pH adjustment include mineral acids such as hydrochloric acid, sulfuric acid, phosphoric acid, nitrous acid, nitric acid, perchloric acid, and sulfamic acid; and organic acids such as formic acid, acetic acid, propionic acid, butyric acid, oxalic acid, succinic acid, maleic acid, lactic acid, and p-toluenesulfonic acid. Of these, the organic carboxylic acids such as formic acid, acetic acid, propionic acid, butyric acid, oxalic acid, succinic acid, and maleic acid are preferred for ease of pH adjustment.

Other solvents which can be used herein should be miscible with water and alcohols. Examples include ketones such as acetone, methyl ethyl ketone, methyl isobutyl ketone, and cyclohexyl ketone, ethers such as tetrahydrofuran, 1,4-dioxane, and 1,2-dimethoxyethane, and esters such as ethyl acetate and ethoxyethyl acetate.

The amount of the solvent used is desirably adjusted such that the overall composition may have a solid concentration of 1 to 60%, more preferably 5 to 40%, and even more preferably 10 to 20% by weight.

The coating composition is preferably adjusted to pH 1 to 7, more preferably pH 2 to 6 by changing the amounts of acid and curing catalyst. The adjustment of a pH level in the range prevents the coating composition from gelling at room temperature, enhancing storage stability.

In the coating composition, any well-known leveling agent may be added for the purposes of improving coating performance and the smoothness of a coating or film. The leveling agent is preferably used in an amount of 0.01 to 2 parts by weight relative to 100 parts by weight of the total solids of components (A) to (C).

Besides, UV absorbers, photostabilizers, dyes, pigments, fillers or the like may be added to the coating composition as long as the objects of the invention are not compromised.

The coating composition in the cured state can form a substantially colorless and transparent film having a water vapor barrier function. The coating composition is coated onto at least one surface of a substrate directly or via at least one layer of different material and cured. In this way, a coated article comprising the substrate and a cured film of the coating composition disposed thereon is obtained.

The coating composition may be coated onto a substrate by any conventional coating techniques, for example, brush coating, spraying, dipping, flow coating, roll coating, curtain coating, spin coating, and knife coating. A suitable coating technique may be chosen in accordance with the shape of the substrate and the desired thickness and properties of the film.

One preferred film-forming process involves the steps of applying a conventional well-known primer to a substrate, air drying or heating the primer coating for curing to form a primer layer as a first layer, applying the coating composition onto the primer layer, drying at room temperature or heating the coating to form a hard coat layer (cured film of the coating composition) as a second layer.

The substrates used herein include molded plastics and composites of plastics and ceramics, glass or metals. Various plastics or organic resin substrates are preferably used. Preferred substrates are of polycarbonate resins, polystyrene resins, acrylic resins, ABS resins, vinyl chloride resins, and the like, with acrylic resins and polycarbonate resins being more preferred. Transparent substrates of these resins are most preferred.

These resin substrates which have been surface treated, specifically by conversion treatment, corona discharge treatment, plasma treatment, acid or alkaline liquid treatment, or primer treatment with modified acrylic resins or the like are also useful. Also included are laminated substrates comprising a resin substrate and a surface layer formed thereon from a resin of different type than the substrate. Exemplary laminated substrates include those consisting of a polycarbonate resin substrate and a surface layer of acrylic resin or urethane resin which are prepared by co-extrusion or lamination technique, and those consisting of a polyester resin substrate and a surface layer of acrylic resin formed thereon.

After the coating composition is applied, the coating may be air dried (held in air) or heated to form a cured film. The curing temperature and time are not particularly limited although the coating is preferably heated at a temperature below the heat resistant temperature of the substrate for 10 minutes to 2 hours. More preferably the coating is heated at a temperature of 80 to 145° C. for 30 minutes to 2 hours.

Although the thickness of the cured film of the coating composition is not particularly limited, it is generally in the range of 0.5 to 60 p.m. Preferably the cured film has a thickness in the range of 1 to 30 µm for ensuring that the cured film has hardness, mar resistance, long-term stable adhesion and crack resistance. A film of less than 0.5 µm thick may be insufficient in hardness and substrate adhesion whereas a film of more than 60 µm thick may contain bubbles and tend to crack. Iteration of the foregoing operation may give an overcoated structure.

EXAMPLE

Synthesis Examples, Examples and Comparative Examples are given below by way of illustration and not by way of limitation. Me stands for methyl. The liquid appearance and film appearance are evaluated by visual observation. The kinematic viscosity is measured at 25° C. by an Ostwald viscometer, and the viscosity is measured at 25° C. by a rotational or Brookfield viscometer. The refractive index is measured by a refracometer RX-7000α by Atago Co., Ltd. The nonvolatile content was determined by placing a predetermined amount of a sample in an aluminum dish, holding it in an oven at 150° C. for 30 minutes, and measuring the weight of the sample again.

The synthesis of alkoxysilane is first described.

Synthesis Example 1

Preparation of Bisphenol A Alkoxysilane (BPA-03Ms)

A flask equipped with a nitrogen inlet, stirrer, condenser and thermometer was charged with 92.6 g (0.406 mol) of 2,2'-bis(4-hydroxyphenyl)propane and 500 g of methyl isobutyl ketone (MIBK), which were stirred for dissolution. To the flask, 100 g (0.82 mol) of allyl bromide and 138 g (1 mol) of dry potassium carbonate were added, whereupon vigorous stirring was continued for 5 hours while heating in an oil bath at 110° C.

After the salt (potassium bromide) formed was removed from the reaction solution by filtration, the MIBK was removed by vacuum stripping, leaving about 90 g of 2,2'-bis(4-allyloxyphenyl)propane in clear oil form. By adding toluene, water washing, and vacuum stripping again, 83.9 g (0.272 mol) of 2,2'-bis(4-allyloxyphenyl)propane was obtained in colorless transparent oil form. The yield was 67%. It had a kinematic viscosity of 48.8 mm²/s and a refractive index of 1.5629.

In 70 ml of toluene was dissolved 30.8 g (0.1 mol) of 2,2'-bis(4-allyloxyphenyl)propane. Two drops of platinum catalyst PL50-T (Shin-Etsu Chemical Co., Ltd.) were added to the solution, which was heated to a temperature of 60° C., and 26 g (0.21 mol) of trimethoxysilane was added dropwise.

The reaction mixture was held at a temperature of 65° C. for 2 hours and then cooled. Wakogel® C-100 (Wako Pure Chemical Industries, Ltd.), 5 g, was added whereupon the platinum catalyst adsorbed thereto was removed by filtration. The solvent was removed by vacuum stripping, leaving 53 g (0.096 mol) of a colorless transparent oily matter. It had a viscosity of 198 mPa·s and a refractive index of 1.5145 (589 nm). The NMR spectrum corresponded to the structure of 2,2'-bis(4-trimethoxysilylpropoxyphenyl)propane, as shown below. The yield was 96%. This silane is designated BPA-03MS.

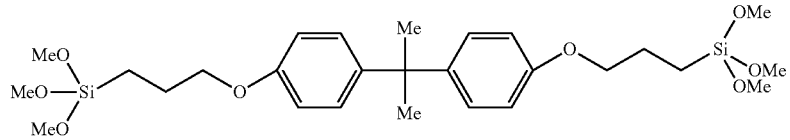

Synthesis Example 2

Preparation of Fluorene Type Alkoxysilane (FLO-03MS)

A flask equipped with a nitrogen inlet, stirrer, condenser and thermometer was charged with 70 g (0.2 mol) of 9,9'-bis(4-hydroxyphenyl)fluorene and 500 g of MIBK, which were stirred for dissolution. To the flask, 50 g (0.41 mol) of allyl bromide and 110 g (0.8 mol) of dry potassium carbonate were added, whereupon vigorous stirring was continued for 5 hours while heating at 110° C.

After the salt (potassium bromide) formed was removed from the reaction solution by filtration, the MIBK was removed by vacuum stripping. By adding toluene to the residue, water washing, and vacuum stripping again, 77.4 g (0.18 mol) of 9,9'-bis(4-allyloxyphenyl)fluorene was obtained in faintly yellow oil form. The yield was 90%. It had a kinematic viscosity of 116 mm²/s and a refractive index of 1.5992.

In 70 ml of toluene was dissolved 43.0 g (0.1 mol) of 9,9'-bis(4-allyloxyphenyl)fluorene. Two drops of platinum catalyst PL50-T (Shin-Etsu Chemical Co., Ltd.) were added to the solution, which was heated to a temperature of 60° C., and 29.3 g (0.24 mol) of trimethoxysilane was added.

The reaction mixture was held at a temperature of 65° C. for 2 hours and then cooled. Wakogel® C-100 (Wako Pure Chemical Industries, Ltd.), 5 g, was added whereupon the platinum catalyst adsorbed thereto was removed by filtration. The solvent was removed by vacuum stripping, leaving 51.1 g (0.095 mol) of a faintly yellow vitreous matter. A viscosity was unmeasurable because it was too viscous. It had a refractive index of 1.5772 (589 nm). The NMR spectrum corresponded to the structure of 9,9'-bis(4-trimethoxysilyl-propoxyphenyl)fluorene, as shown below. The yield was 95%. This silane is designated FLO-03MS.

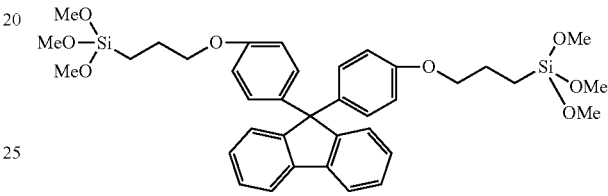

Table 1 sumarizes the physical properties of these silanes.

TABLE 1

| | | Synthesis Example | |
| --- | --- | --- | --- |
| | | 1 | 2 |
| Synthetic silane | | BPA-03MS | FLO-03MS |
| Structure | Silicon functional radical | OMe | OMe |
| | Bonding functional radical | ether | ether |

TABLE 1-continued

| | | Synthesis Example | |
| --- | --- | --- | --- |
| | | 1 | 2 |
| Refractive index | 589 nm (ne) | 1.5145 | 1.5772 |
| | 486 nm (nf) | 1.5315 | 1.5945 |
| | 656 nm (nc) | 1.5094 | 1.5707 |
| Abbe constant | (ne − 1)/(nf − nc) | 23.3 | 24.3 |
| Viscosity | mPa·s | 198 | vitreous |
| Nonvolatile | % (150° C./0.5 hr) | 99.24 | 99.1 |

Next, preparation and evaluation of coating compositions are described.

Example 1

A 2-L flask equipped with a nitrogen inlet, stirrer, condenser and thermometer was charged with 500 g of isopropyl alcohol (IPA) and 100 g of silane BPA-03MS obtained in Synthesis Example 1, which were stirred while maintaining at 20° C. A mixture of 44.2 g of Snowtex 0 (Nissan Chemical Industries, Ltd., water-dispersed colloidal silica, average particle size 15-20 nm, 20 wt % $SiO_2$-containing aqueous solution) and 40.1 g of a 0.25N acetic acid aqueous solution was added to the solution, which was stirred at a high speed.

After stirring for 3 hours at 60° C., 300 g of cyclohexanone was added to the solution. The solution was heated while bubbling nitrogen, thereby distilling off the methanol byproduct, IPA and part of water in a total amount of 250 g.

The solution was cooled to room temperature, after which 10 g (0.12 wt % as solid) of 1 wt % aluminum acetylacetonate in cyclohexanone was added as a curing catalyst. The coating solution thus obtained had a nonvolatile content of 11.02% (150° C./0.5 hr) and a kinematic viscosity of 4.45 $mm^2/s$.

Example 2

The procedure of Example 1 was repeated except that 100 g of silane FLO-03MS obtained in Synthesis Example 2 was used instead of 100 g of BPA-03MS. The coating solution obtained had a nonvolatile content of 12.7% (150° C./0.5 hr) and a kinematic viscosity of 3.76 $mm^2/s$.

Comparative Example 1

A 2-L flask equipped with a nitrogen inlet, stirrer, condenser and thermometer was charged with 500 g of IPA and 100 g of silane BPA-03MS, which were stirred while maintaining at 20° C. A mixture of 44.2 g of deionized water and 40.1 g of a 0.25N acetic acid aqueous solution was added to the solution, which was stirred at a high speed.

After stirring for 3 hours at 60° C., 300 g of cyclohexanone was added to the solution. The solution was heated while bubbling nitrogen, thereby distilling off the methanol byproduct, IPA and part of water in a total amount of 250 g.

The solution was cooled to room temperature, after which 10 g (0.13 wt % as solid) of 1 wt % aluminum acetylacetonate in cyclohexanone was added as a curing catalyst. The coating solution thus obtained had a nonvolatile content of 9.8% (150° C./0.5 hr) and a kinematic viscosity of 2.78 $mm^2/s$.

Comparative Example 2

The procedure of Example 1 was repeated except that the 1 wt % aluminum acetylacetonate in cyclohexanone as the curing catalyst was omitted. The coating solution obtained had a nonvolatile content of 12.69% (150° C./0.5 hr) and a kinematic viscosity of 4.18 $mm^2/s$.

Example 3

A 2-L flask equipped with a nitrogen inlet, stirrer, condenser and thermometer was charged with 500 g of IPA and 100 g of silane BPA-03MS, which were stirred while maintaining at 20° C. 40.1 g of a 0.25N acetic acid aqueous solution was added to the solution, which was stirred at a high speed.

After stirring for 3 hours at 60° C., 300 g of cyclohexanone was added to the solution. The solution was heated while bubbling nitrogen, thereby distilling off the methanol byproduct, IPA and part of water in a total amount of 250 g.

The solution was cooled to room temperature, after which 44.2 g of Snowtex 0 (Nissan Chemical Industries, Ltd., water-dispersed colloidal silica, average particle size 15-20 nm, 20 wt % $SiO_2$-containing aqueous solution) was added, and 10 g of 1 wt % aluminum acetylacetonate in cyclohexanone was added as a curing catalyst. The coating solution thus obtained had a nonvolatile content of 10.28% (150° C./0.5 hr) and a kinematic viscosity of 3.06 $mm^2/s$.

Comparative Example 3

A 2-L flask equipped with a nitrogen inlet, stirrer, condenser and thermometer was charged with 500 g of IPA and 161 g of trimethoxysilane (KBM-13 by Shin-Etsu Chemical Co., Ltd.), which were stirred while maintaining at 20° C. A mixture of 44.2 g of Snowtex O (Nissan Chemical Industries, Ltd., water-dispersed colloidal silica, average particle size 15-20 nm, 20 wt % $SiO_2$-containing aqueous solution) and 40.1 g of a 0.25N acetic acid aqueous solution was added to the solution, which was stirred at a high speed.

After stirring for 3 hours at 60° C., 300 g of cyclohexanone was added to the solution. The solution was heated while bubbling nitrogen, thereby distilling off the methanol byproduct, IPA and part of water in a total amount of 250 g.

The solution was cooled to room temperature, after which 10 g (0.11 wt % as solid) of 1 wt % aluminum acetylacetonate in cyclohexanone was added as a curing catalyst. The coating solution thus obtained had a nonvolatile content of 11.24% (150° C./0.5 hr) and a kinematic viscosity of 3.90 $mm^2/s$.

Evaluation of Compositions of Examples 1, 3 and Comparative Examples 1, 2

Each of the compositions of Examples and Comparative Examples was applied onto a glass substrate and heat cured at 105° C. for 1 hour into a film of 5 μm thick. The appearance of the film was evaluated by visual observation. The sample was immersed in IPA, after which IPA dissolution was evaluated according to the following criterion.

○: no change
X: dissolved away, vanished from substrate

The physical properties of the compositions of Examples and Comparative Examples are summarized in Table 2 together with the test results.

TABLE 2

| Composition | Example 1 | Comparative Example 1 | Comparative Example 2 | Example 3 |
|---|---|---|---|---|
| Units and conditions | BPA-SiO$_2$ | BPA | no catalyst | BPA + SiO$_2$ simple addition |
| BPA-03MS/SiO$_2$ (pbw) | 100/44.2 | 0 | 100/44.2 | 0 |
| BPA-03MS (pbw) | 0 | 100 | 0 | 100 |
| Snowtex O (pbw) | 0 | 0 | 0 | 44.2 |
| Al(acac)$_3$ 1% cHex (pbw) | 10 | 10 | 0 | 10 |
| Al(acac)$_3$ (wt %*) | 0.12 | 0.13 | 0 | 0.12 |
| Presence of silica sol during hydrolysis | present | present | present | absent |

TABLE 2-continued

| Composition | Example 1 | Comparative Example 1 | Comparative Example 2 | Example 3 |
|---|---|---|---|---|
| Silane/SiO$_2$ (solid weight ratio) | 90/10 | 100/0 | 90/10 | 90/10 |
| Composition's physical properties | | | | |
| Liquid appearance | clear | clear | clear | milky white, clear |
| Kinematic viscosity (mm$^2$/s) | 4.45 | 2.78 | 4.18 | 3.06 |
| Refractive index @25° C | 1.4169 | 1.4555 | 1.4243 | 1.4603 |
| Nonvolatile (%) @150° C./0.5 hr | 11.02 | 9.8 | 12.69 | 10.28 |
| Test results | | | | |
| Film appearance | transparent, good | transparent, good | transparent, good | milky white, semi-transparent |
| IPA dissolution | ○ | ○ | X | ○ |

*wt % on a solid basis

Evaluation of Compositions of Examples 1, 2 and Comparative Examples 1, 3

(1) Formation of Self-Supporting Film and Measurement of Water Vapor Permeability Each of the compositions of Examples and Comparative Examples was applied onto a cleaned surface of a PET substrate of 25 μm thick by flow coating, air dried at room temperature for 45 minutes, and cured at 105° C. for 60 minutes into a film of 20 μm thick. In Examples 1, 2 and Comparative Example 1, a self-supporting film of 10 cm by 10 cm by 20 μm thick was obtained by peeling the film from the PET substrate. In Comparative Example 3, a self-supporting film could not be obtained because of low film strength.

In Examples 1, 2 and Comparative Example 1 where a self-supporting film was obtained, an aluminum foil having a permeable area of 2.5 cm$^2$ was attached to the self-supporting film to construct a test specimen. In Comparative Example 3 where no self-supporting film could be obtained, a test specimen was constructed by immersing a membrane (Gore-tex PRM-001, 14 μm thick, 5,500 g/m$^2$-day at 40° C.) in the composition of Comparative Example 3, placing the coated membrane on a Teflon® substrate, air drying, baking at 105° C., and attaching an aluminum foil having a permeable area of 2.5 cm$^2$ thereto.

A water vapor permeability was measured using a water vapor permeability tester L80-5000 (Lyssy AG) under conditions: a permeable area of 2.5 cm$^2$ and a temperature of 40° C.

(2) Formation of Film and Evaluation of Film Properties

Each of the compositions of Examples and Comparative Examples was applied onto a cleaned surface of a polyacrylate resin substrate of 2.5 mm thick by flow coating, air dried at room temperature for 45 minutes, and cured at 105° C. for 60 minutes into a film of 10 μm thick. The film was evaluated for adhesion and mar resistance.

Adhesion (Initial and after Boiling)

Adhesion was analyzed by a cross-hatch adhesion test according to JIS K5400, specifically by scribing the film with a razor along 6 longitudinal and 6 transverse lines at a spacing of 2 mm to define 25 square sections, tightly attaching commercially available adhesive tape thereto, rapidly pulling back the adhesive tape at an angle of 90°, and counting the number (X) of film sections kept unpeeled. The result is expressed as X/25. Adhesion was examined before and after the sample was immersed in boiling water for 2 hours.

The outer appearance of the film was visually examined before and after the sample was immersed in boiling water for 2 hours.

○: no peel

X: peel of film in part or entirety

Mar Resistance

Mar resistance was analyzed by a color fastness rubbing tester AB-301, specifically by rubbing the film with steel wool #000 under a load of 250 g at 50 Hz over ten back-and-forth strokes, and observing flaws on the film surface. Haze (Hz) was measured before and after the test. Mar resistance was reported by a haze difference (ΔHz) before and after the test, that is, ΔHz=[(Hz value after test)-(initial Hz value)].

○: ΔHz≦6.0

Δ: 6.0<ΔHz<10.0

X: ΔHz≧10.0

Notably, optical property and film formability were evaluated according to the following criteria, and an overall evaluation was made.

Optical Property

○: transparent and good

X: white or milky white

Film Formability

○: self-supporting film can be formed

X: self-supporting film cannot be formed

Overall Evaluation

○: can be used as water vapor barrier coat

X: cannot be used as water vapor barrier coat

The physical properties of the compositions of Examples and Comparative Examples are summarized in Table 3 together with the results of the foregoing tests.

TABLE 3

|  |  | Example | | Comparative Example | |
| --- | --- | --- | --- | --- | --- |
|  | Composition | 1 | 2 | 1 | 3 |
| Formulation | Units and conditions | BPA-SiO$_2$ | FLO-SiO$_2$ | BPA | KBM13-SiO$_2$ |
| Alkoxysilane | BPA-03MS/SiO$_2$ (pbw) | 100/44.2 | 0 | 0 | 0 |
|  | FLO-03MS/SiO$_2$ (pbw) | 0 | 100/44.2 | 0 | 0 |
|  | M-13/SiO$_2$ (pbw) | 0 | 0 | 0 | 161/44.2 |
|  | BPA-03MS (pbw) | 0 | 0 | 100 | 0 |
|  | Presence of silica sol during hydrolysis | present | present | present | present |
| Compositional ratio | Silane/SiO$_2$ (solid weight ratio) | 90/10 | 90/10 | 100/0 | 90/10 |
| Catalyst | Al(acac)$_3$ 1% cHex (pbw) | 10 | 10 | 10 | 10 |
| Physical properties of composition | | | | | |
| Liquid physical properties | Liquid appearance | transparent | transparent | transparent | transparent |
|  | Kinematic viscosity (mm$^2$/s) | 4.45 | 3.76 | 2.78 | 3.90 |
|  | Refractive index @25° C. | 1.4169 | 1.4484 | 1.4555 | 1.3897 |
|  | Nonvolatile (%) @150° C./0.5 hr | 11.02 | 12.7 | 9.8 | 11.24 |
| Test results | | | | | |
| Film strength | self-supporting film** | ○ | ○ | ○ | X |
| Film appearance | on acrylic resin substrate | transparent, good | transparent, good | transparent, good | transparent, good |
| Water vapor permeability | Film thickness (μm) | 26 | 20 | 25 | 22 |
|  | Permeability (g/m$^2$-day) | 19 | 36 | 31 | 1100 |
| Adhesion | Initial | 25/25 | 25/25 | 25/25 | 0/25 |
|  | After boiling @100° C./2 hr | 25/25 | 25/25 | 25/25 | 0/25 |
| Mar resistance | Initial Hz | 0.88 | 0.43 | 0.54 | 0.35 |
|  | Hz after rubbing @250 g/10 strokes | 3.7 | 2.97 | 17.15 | 2.56 |
|  | ΔHz | 2.82 | 2.54 | 16.61 | 2.21 |
| Evaluation | | | | | |
| Optical property |  | ○ | ○ | ○ | ○ |
| Film formability |  | ○ | ○ | ○ | X |
| Film adhesion |  | ○ | ○ | ○ | X |
| Mar resistance |  | ○ | ○ | X | ○ |
| Overall evaluation |  | ○ | ○ | X | X |

**formation of self-supporting film
○: can be formed
X: cannot be formed

As seen from the test results, the cured films of the coating compositions within the scope of the invention are hard and mar resistant.

Japanese Patent Application No. 2009-185591 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A coated article comprising
a transparent substrate selected from the group consisting of polycarbonate resins, polystyrene resins, acrylic resins, ABS resins, and vinyl chloride resins, and
as a hard coat layer, a film of a coating composition cured thereto, said coating composition comprising (A) a hydrolytic condensate of an alkoxysilane, (B) silica colloid sol, and (C) a curing catalyst as essential components, wherein the alkoxysilane hydrolytic condensate (A) is obtained from hydrolytic condensation of a hydrolyzable radical-containing organosilicon compound comprising at least 10% by weight of a compound having the general formula (I):

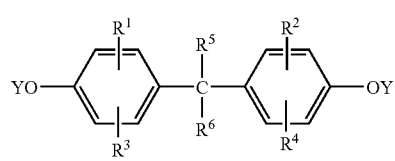

wherein $R^1$ to $R^4$ are each independently hydrogen, halogen, alkyl, alkoxy or aryl radical, $R^5$ and $R^6$ are each independently hydrogen, $C_1$-$C_{10}$ alkyl or $C_6$-$C_{10}$ aryl, $R^5$ and $R^6$ may bond together to form a $C_3$-$C_{13}$ carbocyclic or heterocyclic ring with the carbon atom to which they are attached, the carbon-containing radicals of $R^5$ and $R^6$ may have a $C_1$-$C_5$ alkyl, $C_2$-$C_5$ alkenyl or $C_1$-$C_5$ alkoxy substituted thereon, and Y is each independently a radical of the formula:

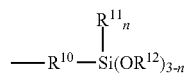

wherein $R^{10}$ is $C_2$-$C_6$ alkylene, $R^{11}$ and $R^{12}$ are each independently $C_1$-$C_5$ alkyl, and n is 0, 1 or 2.

2. The coated article of claim 1, wherein the film of the coating composition is formed on a primer layer which has been formed on the substrate.

3. A coated article comprising
a substrate in the form of a molded plastic or a composite of plastic and ceramic, glass, or metal, and
as a hard coat layer a film of a coating composition cured thereto, said coating composition comprising (A) a hydrolytic condensate of an alkoxysilane, (B) silica colloid sol, and (C) a curing catalyst as essential components, wherein the alkoxysilane hydrolytic condensate (A) is obtained from hydrolytic condensation of a hydrolyzable radical-containing organosilicon compound comprising at least 10% by weight of a compound having the general formula (I):

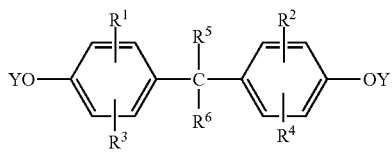
(I)

wherein $R^1$ to $R^4$ are each independently hydrogen, halogen, alkyl, alkoxy or aryl radical, $R^5$ and $R^6$ are each independently hydrogen, $C_1$-$C_{10}$ alkyl or $C_6$-$C_{10}$ aryl, $R^5$ and $R^6$ may bond together to form a $C_3$-$C_{13}$ carbocyclic or heterocyclic ring with the carbon atom to which they are attached, the carbon-containing radicals of $R^5$ and $R^6$ may have a $C_1$-$C_5$ alkyl, $C_2$-$C_5$ alkenyl or $C_1$-$C_5$ alkoxy substituted thereon, and Y is each independently a radical of the formula:

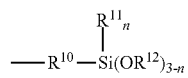

wherein $R^{10}$ is $C_2$-$C_6$ alkylene, $R^{11}$ and $R^{12}$ are each independently $C_1$-$C_5$ alkyl, and n is 0, 1 or 2,
wherein the film of the coating composition is formed on a primer layer which has been formed on the substrate.

4. The coated article of claim 3, wherein the plastic is selected from polycarbonate resins, polystyrene resins, acrylic resins, ABS resins, and vinyl chloride resins.

* * * * *